Dec. 30, 1952     E. W. BECHTOLD     2,623,434
THREE-COMPONENT WIDE-ANGLE CAMERA OBJECTIVE
Filed Oct. 22, 1948
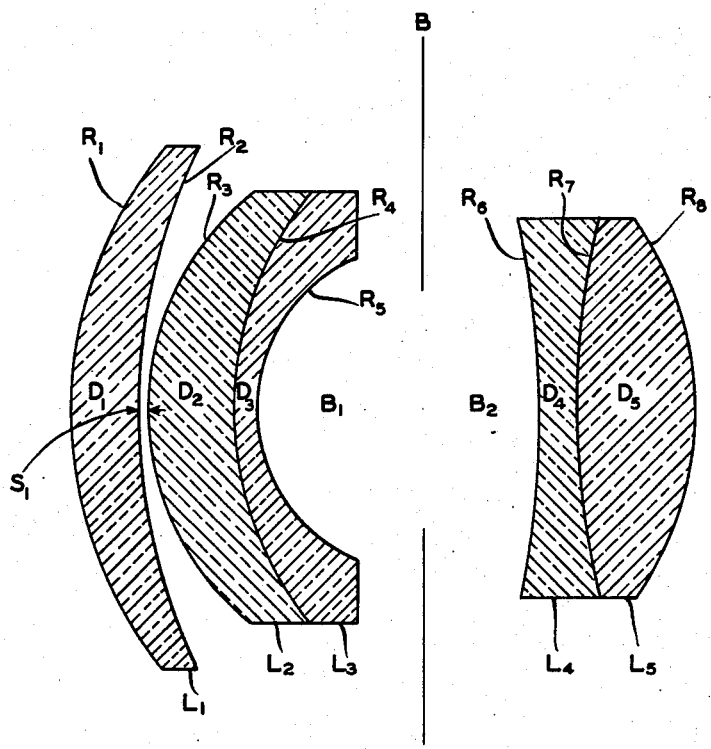
INVENTOR.
EDWIN W. BECHTOLD
BY
—ATTORNEY—

Patented Dec. 30, 1952

2,623,434

UNITED STATES PATENT OFFICE 2,623,434

THREE-COMPONENT WIDE-ANGLE CAMERA OBJECTIVE

Edwin W. Bechtold, Forest Hills, N. Y., assignor to Bendix Aviation Corporation, Teterboro, N. J., a corporation of Delaware Application October 22, 1948, Serial No. 55,977

4 Claims. (Cl. 88—57)

The present invention relates to a camera objective, and more particularly to a wide-angle objective.

An object of my present invention is to provide a wide-angle, high speed photographic objective having a short focal length.

A further object of the present invention is to provide an objective of the character indicated which is well corrected for spherical and chromatic aberrations, astigmatism and coma.

Another object of my invention is to provide a photographic objective of the character indicated having a collective front element, a dispersive intermediate element composed of two cemented elements, one collective and one dispersive; and a collective rear element composed of a dispersive and collective element cemented together.

A further object of the invention is to provide a wide-angle objective of the character described in which a surface of the front element and a surface of the last element are aplanatic surfaces.

Still another object of my invention is to provide an objective of the character indicated in which no large contributions to coma and astigmatism are made by any one surface.

Still a further object of this invention is to provide a high speed, wide-angle objective of the character described having a resolving power diminishing less than 50% over its entire field.

Yet another object of this invention is to provide an objective of the character described which is relatively simple to construct and not very sensitive to manufacturing tolerances.

Other objects of this invention will in part be obvious and in part hereinafter pointed out.

In the accompanying drawing an F:2.5–17.5 mm., 60° objective embodying one of the various possible forms of my invention is illustrated and described below by exact data as to radii, lens thicknesses, diaphragm intervals and glasses employed. As will hereinafter be apparent, other glasses may be used from those set forth and other forms of lenses may be employed, as well as their order of arrangement without departing from the spirit of this invention.

The objective comprises the lenses $L_1$, $L_2$, $L_3$, $L_4$ and $L_5$ having thicknesses $D_1$, $D_2$, $D_3$, $D_4$ and $D_5$, respectively, at the axis. The lens $L_1$ having lens-surface radii $R_1$, $R_2$ possesses a collective effect and is separated by an air space $S_1$ from a dispersive doublet consisting of the cemented lenses $L_2$ and $L_3$. The radii of lens $L_2$ are designated $R_3$, $R_4$ and that of lens $L_3$ by $R_4$, $R_5$. A dispersive effect results from the facing surfaces $R_2$, $R_3$ bounding the air space separating $L_1$, and $L_2$, $L_3$. The radii $R_2$ and $R_6$ are chosen to form aplanatic surfaces so that no spherical aberration coma or astigmatism is introduced by these surfaces.

Lenses $L_4$, $L_5$ having radii respectively of $R_6$, $R_7$ and $R_7$, $R_8$, are cemented together on the surface $R_7$ to form a collective doublet to complete the objective. The doublets $L_2$, $L_3$ and $L_4$, $L_5$ are separated by a diaphragm B, the distances from the diaphragm to the adjoining lens-fronts being designated at $B_1$ and $B_2$, respectively.

The radii $R_1$, $R_3$, $R_5$ and $R_8$ are so chosen that the chief ray of any oblique bundle strikes each surface nearly normally. Thus, with the angle of incidence of the chief ray zero, no primary astigmatism and coma are introduced at these surfaces. The radii $R_2$, $R_6$ form aplanatic surfaces and no primary astigmatism or coma will be present in the final image. The remaining variables of separation and thicknesses have been chosen to balance out any remaining spherical aberration and reduce the Petzval sum to a nearly zero value. It will be appreciated from the foregoing description that no large contributions to coma and astigmatism are made by any one surface which requires balancing out by the other surfaces as has been heretofore prevalent in the art. Each surface of my objective has a nearly zero contribution to coma and astigmatism by either having no spherical contribution, or by the chief ray striking at nearly normal incidence. From the data hereinafter given, it will be apparent that the crown and flint glasses in the doublet lenses described may be transposed in either or both of the doublets with only a slight compensating change in the cemented radii. The low differences in the indices of refraction of the glasses used at all cemented surfaces of the objective contribute nothing to astigmatic, comatic or spherical aberrations and serves principally to correct for longitudinal and lateral chromatic aberrations.

The numerical data for the described objective are as follows:

*Example I*

[F:2.7   EFL=17.5 mm.]

| | | $n_D$ | V |
|---|---|---|---|
| $R_1=$ 8.10 | | | |
| $R_2=$ 11.66 | $D_1$=1.46 | 1.6716 | 47.5 |
| | $S_1=$ .10 | Air | |
| $R_3=$ 5.41 | $D_2$=1.62 | 1.617 | 55.0 |
| $R_4=$ 6.51 | $D_3=$ .50 | 1.649 | 33.8 |
| $R_5=$ 3.29 | | | |
| | $B_1$=3.43 | Air | |
| | $B_2$=2.06 | Air | |
| $R_6=$ −25.76 | $D_4=$ .73 | 1.689 | 30.9 |
| $R_7=$ 15.78 | | | |
| $R_8=$ −6.51 | $D_5$=2.41 | 1.6716 | 47.5 |

Example II
[F:2.7  EFL=1.00 mm.]

|  |  | $n_D$ | V |
|---|---|---|---|
| $R_1$= .4629 | $D_1$=.0834 | 1.6716 | 47.5 |
| $R_2$= .6663 | $S_1$=.0057 | Air |  |
| $R_3$= .3091 | $D_2$=.0926 | 1.617 | 55.0 |
| $R_4$= .3720 | $D_3$=.0286 | 1.649 | 33.8 |
| $R_5$= .1880 | $B_1$=.1960 | Air |  |
|  | $B_2$=.1177 | Air |  |
| $R_6$=−1.4720 | $D_4$=.0417 | 1.689 | 30.9 |
| $R_7$= .9017 | $D_5$=.1377 | 1.6716 | 47.5 |
| $R_8$= −.3720 |  |  |  |

Having thus described my invention, I claim as new and desire to secure by Letters Patent:

1. A objective of the kind described comprising a collective front element, a collective rear doublet, and a dispersive center doublet, said element and said doublets being axially aligned and air separated from one another, a diaphragm separating said center doublet and said rear doublet, said front element having a convex front face and an aplanatic concave rear face directed toward said center doublet, said center doublet comprising a front lens and a rear lens of different materials having substantially the same indices of refraction, the front face of the front lens being convex and the rear face of the rear lens being concave, the convex face of the front lens of said center doublet being of lesser radius than the concave rear face of said front element, and said rear doublet comprising a front lens and a rear lens of different materials having substantially the same indices of refraction, the front lens of said rear doublet having a concave aplanatic front face and the rear lens of said rear doublet having a convex rear face, the faces of said element and doublets other than said aplanatic faces being curved and arranged so that the chief ray of any oblique bundle strikes said faces substantially normally.

2. An objective corrected to reduce the amount of coma, astigmatism and spherical and chromatic aberration and having three lens elements separated by air spaces from one another, the first lens element being less than .1 F in axial thickness and having a front face with a radius of curvature between .4 F and .5 F and having an aplanatic rear face, the second lens element being between .10 F and .15 F in axial thickness and having concentric front and rear faces with radii of curvature so that the chief ray of any oblique bundle strikes said faces substantially normally, and the third lens element being between .15 F and .25 F in axial thickness and having an aplanatic front face and having a rear face with a radius of curvature so that the chief ray strikes said rear face substantially normally.

3. An objective corrected to reduce the amount of coma, astigmatism and spherical and chromatic aberration and having approximately the following specifications:

| Lens | Radii | Spacings | $n_D$ | V |
|---|---|---|---|---|
| I | $R_1$= +.4629 F | $D_1$=.0834 F | 1.6716 | 47.5 |
|  | $R_2$= +.6663 F | $S_1$=.0057 F |  |  |
|  | $R_3$= +.3091 F |  |  |  |
| II | $R_4$= +.3720 F | $D_2$+$D_3$=.1212 F | 1.617–1.649 | 33.8–55.0 |
|  | $R_5$= +.1880 F | $B_1$+$B_2$=.3137 F |  |  |
| III | $R_6$=−1.4720 F | $D_4$+$D_5$=.1794 F | 1.671–1.689 | 30.9–47.5 |
|  | $R_8$= −.3720 F |  |  |  | where the Roman numerals refer to elements starting with the front side, $n_D$ is the index of refraction with reference to the D line of the spectrum, V is the dispersive index, $R_1$ to $R_8$ are the radii of curvature of the refractive surfaces from front to rear as indicated in the drawing, the + and − signs refer respectively to surfaces convex and concave to the front, $D_1$ to $D_5$ are the axial thicknesses of the elements, $S_1$ is the air spacing between elements I and II and $B_1$+$B_2$ is the air spacing between elements II and III, and F is the equivalent focal length of the objective.

4. An objective corrected to reduce the amount of coma, astigmatism and spherical and chromatic aberration and having approximately the following specifications:

| Lens | Radii | Spacings | $n_D$ | V |
|---|---|---|---|---|
| I | $R_1$= +.4629 F | $D_1$=.0834 F | 1.6716 | 47.5 |
|  | $R_2$= +.6663 F | $S_1$=.0057 F |  |  |
|  | $R_3$= +.3091 F |  |  |  |
| II | $R_4$= +.3720 F | $D_2$=.0926 F | 1.617 | 55.0 |
| III | $R_5$= +.1830 F | $D_3$=.0236 F | 1.649 | 33.8 |
|  | $R_6$=−1.4720 F | $B_1$+$B_2$=.3137 F |  |  |
| IV | $R_7$= +.9017 F | $D_4$=.0417 F | 1.689 | 30.9 |
| V | $R_8$= −.3720 F | $D_5$=.1377 F | 1.6716 | 47.5 | where the Roman numerals refer to elements starting with the front side, $n_D$ is the index of refraction with reference to the D line of the spectrum, V is the dispersive index, $R_1$ to $R_8$ are the radii of curvature of the refractive surfaces from front to rear as indicated in the drawing, the + and − signs refer respectively to surfaces convex and concave to the front, $D_1$ to $D_5$ are the axial thicknesses of the elements, $S_1$ is the air spacing between elements I and II and $B_1$+$B_2$ is the air spacing between elements III and IV, and F is the equivalent focal length of the objective.

EDWIN W. BECHTOLD.

REFERENCES CITED

The following references are of record in the file of this patent:

UNITED STATES PATENTS

| Number | Name | Date |
|---|---|---|
| 52,129 | Boyle | Jan. 23, 1866 |
| 55,195 | Zentmayer | May 29, 1866 |
| 560,460 | Aldis | May 19, 1896 |
| 1,998,704 | Bertele | Apr. 23, 1935 |
| 2,124,356 | Rayton | July 19, 1938 |
| 2,186,622 | Bertele | Jan. 9, 1940 |

FOREIGN PATENTS

| Number | Country | Date |
|---|---|---|
| 17,624 | Great Britain | of 1907 |
| 350,323 | Great Britain | June 11, 1931 |